April 25, 1967  C. ROY  3,315,421
COLLAPSIBLE TRAILER TENT
Filed Dec. 30, 1964  3 Sheets-Sheet 1

INVENTOR
Clovis ROY
BY
ATTORNEYS

INVENTOR
Clovis ROY
BY
ATTORNEYS

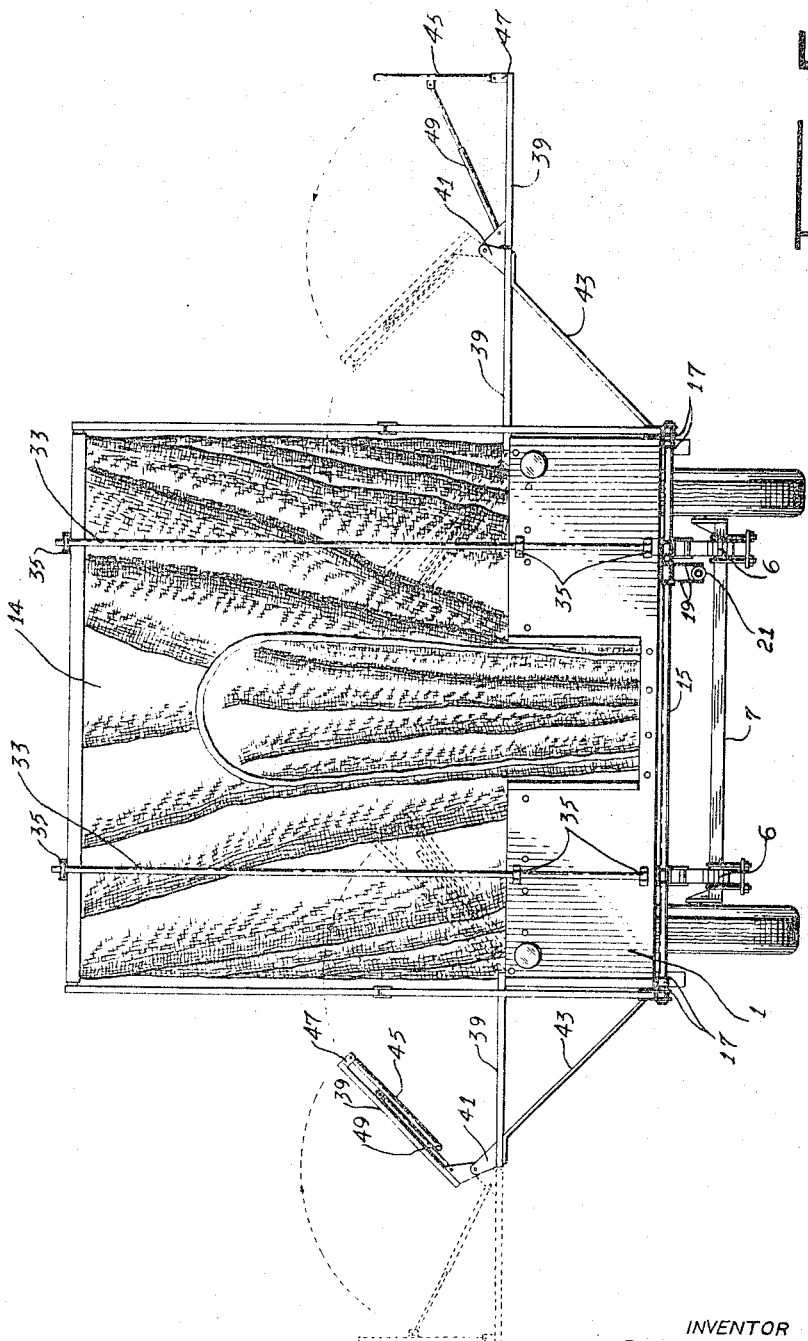

United States Patent Office 3,315,421
Patented Apr. 25, 1967

3,315,421
COLLAPSIBLE TRAILER TENT
Clovis Roy, 1955 Martin, St-Hubert,
Chambly County, Quebec, Canada
Filed Dec. 30, 1964, Ser. No. 422,134
3 Claims. (Cl. 52—66)

This application relates to a trailer-tent, that is, to a shelter which offers both the features of a trailer and those of a tent in attempting to derive the advantages of both without the inconveniences.

Many different types of trailer-tents have been designed but while offering, once in upright position, nearly the same comfort as a trailer and when in folded condition, the convenient collapsible volume-saving advantage of the tent, the means for erecting them is usually complicated, cumbersome and costly.

It is therefore a main object of the invention to provide a trailer-tent having the above-noted features of convenience and space saving yet provided with a considerably simplified mechanism for setting it up into usable condition.

A further object of the invention lies in providing such a trailer-tent with a simplified operating mechanism that can easily be used by any unskilled or relatively weak person yet be of low cost manufacture and easy in maintenance.

The above objects may be obtained with a trailer-tent made according to the invention which resides in the combination of a base, a cover liftable from the base; pairs of arms; for each pair of arms, an articulated joint connecting two ends thereof and pivot joints connecting the other ends, one to the base and one to the cover and means to simultaneously bring the arms of each pair in and out of alignment to raise and lower the cover in relation to the base.

In the preferred form of the invention, pivot shafts are provided transversely of the base to which the above-mentioned means are connected and the latter means comprise links secured to and radially projecting from the shafts; reversely threaded sleeves mounted on the links; an operating rod correspondingly threaded at the end thereof and threaded in the sleeves, and means to cause rotation of the threaded rod to rotate the shafts whereby to bring the arms in and out of alignment positions.

It is believed that a better understanding of the invention will be afforded by the detailed description that follows which has reference to the appended drawing wherein:

FIG. 5 is a rear elevation view of the trailer shown in partially opened condition.

Figure 1:
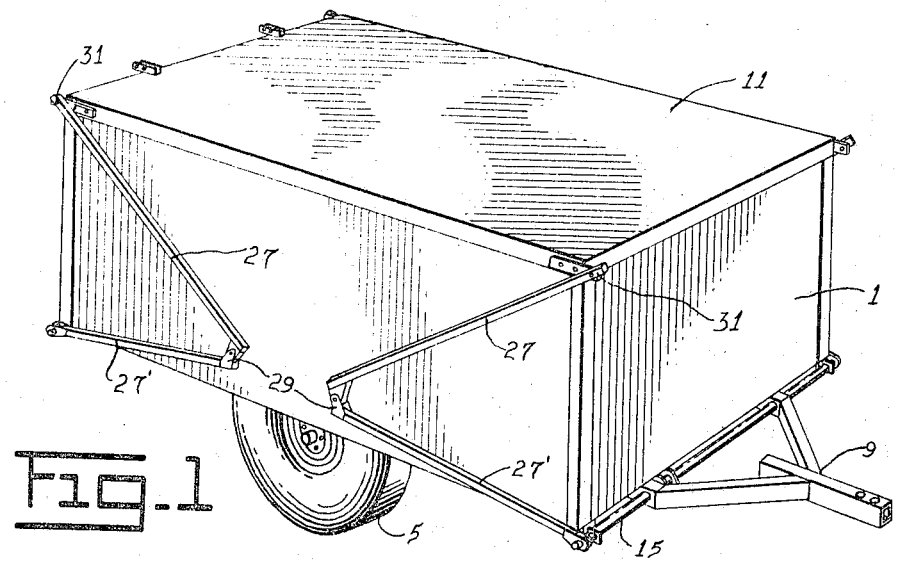
FIG. 1 is a perspective view of the trailer-tent made according to the invention, shown in collapsed condition.
Figure 2:
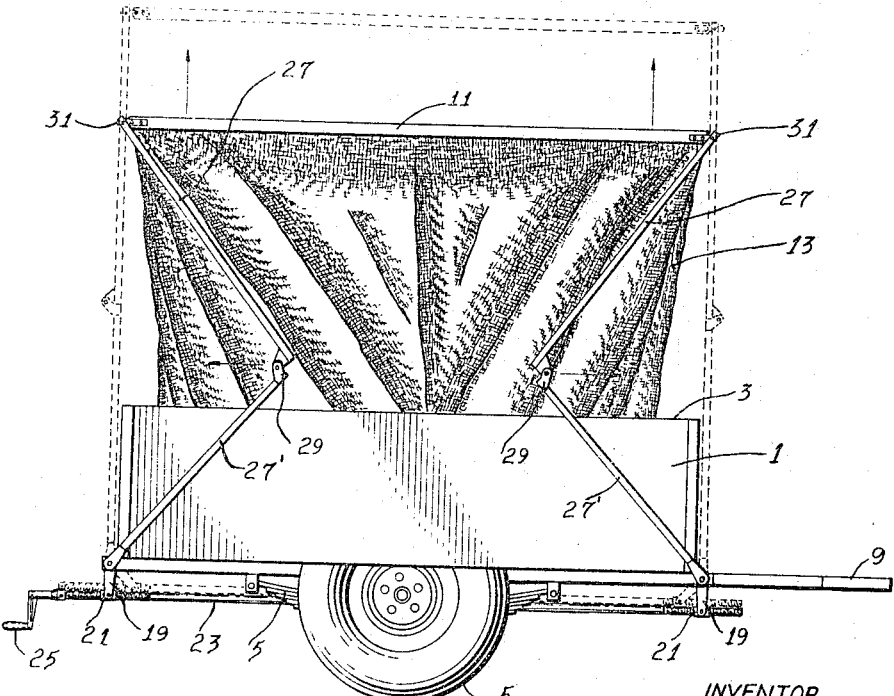
FIG. 2 is a side elevation view of the trailer-tent of the invention shown in partially unfolded condition.
Figure 3:
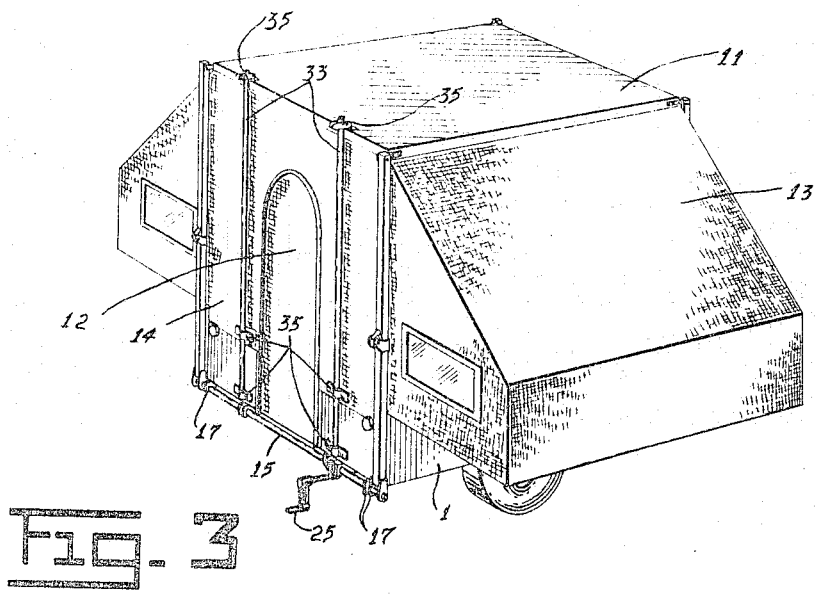
FIG. 3 is a perspective view of the trailer-tent of the invention shown in fully opened condition.

Referring now to the drawing, the invention is a wheeled vehicle comprising a box-like base 1 having an open top 3; base 1 mounted on wheels 5 in any known manner such as through suspension spring means 6 securing the bottom of box-like base 1 to an axle 7. The usual trailer hitch means 9 is provided forwardly of base 1 for attachment to the rear of a car.

A cover 11 is provided for closing up the box-like base, the said cover being liftable away from the open top 3. To the underside of cover 11 is fixed the tent-like material 13 so as to hang therefrom, in the manner to be described more fully hereinafter.

At the bottom of box-like base 3 are mounted two pivot shafts 15, positioned at two opposed ends of base 1. These shafts are mounted for rotation in any known manner such as by being supported by the bracket-bearing 17. A pair of links 19 is secured to and radially projects from each shaft 17 and an inwardly threaded sleeve 21 is pivotally mounted between each pair of links 19, below shafts 15. A correspondingly threaded operating rod 23, having an operating handle 25 at one end thereof, is threaded into each of these two sleeves 21. It is to be noted here that the threads at one end of rod 23 are reverse those at the other end. From this description, it would be understood that whenever operating handle 25 is rotated, sleeves 21 are displaced relative to one another to thus cause rocking of links 19 and finally, pivoting of shafts 15 in reversed direction, that is, one clockwise and one counterclockwise.

The lifting mechanism comprises a pair of arms 27, 27' for each corner of the box-like base 1 and cover 11. Any known articulated joint 29 interconnects each pair of arms 27, 27' while upper arms 27 are connected to cover 11 by means of a pivot joint 31 and lower arms 27' are secured to shafts 15 whereby to rotate in unison therewith. It should thus be understood that whenever shafts 15 are rotated in reverse directions as explained above, arms 27, 27' will move, in pairs, in and out of alignment to raise and lower cover 11 in relation to base 1.

A pair of guiding bars 33 is provided, which bars are upwardly secured to an outer face of box-like base 1 such as by means of conventional fasteners 35, bars 33 projecting away from open top 3 and sliding into guiding brackets 35 secured along an edge of cover 11. As will be understood, these bars which should be sufficiently rigid function to prevent undue swaying of cover 11 as it is raised to thus avoid any bending of the raising arms 27, 27'.

Figure 4:
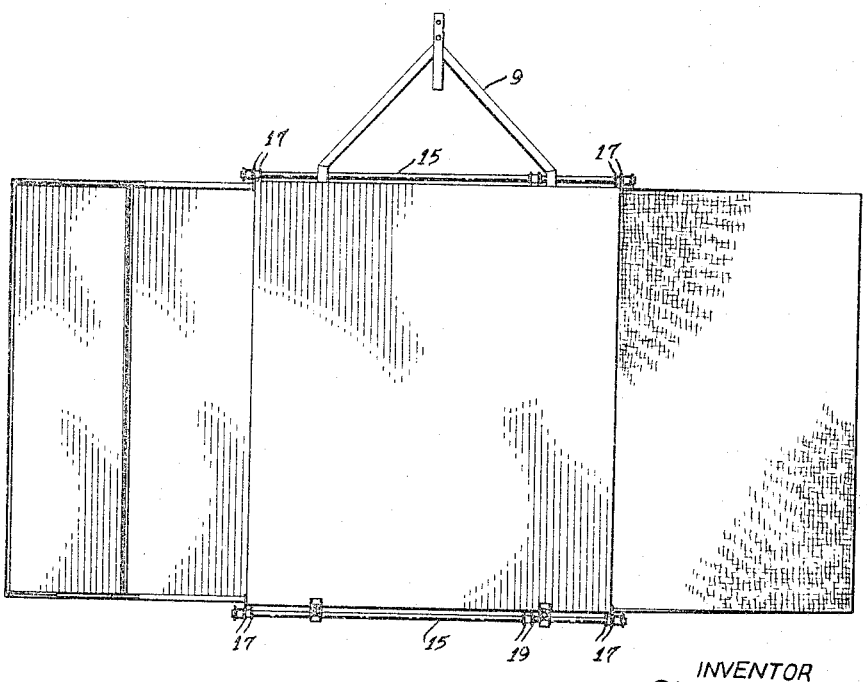
FIG. 4 is a top elevation view of the trailer in the condition of FIG. 3.

Finally, as best illustrated in FIGS. 4 and 5, the invention proposes the provision of foldable sleeping panels 39, 39' connected along a common edge thereof by conventional pivot bracket means 41 so as to be brought from folded to aligned position as illustrated on the left and right of FIG. 5. The inward panel 39 is hingedly mounted along a top edge of base 1 and is provided with compression bars 43 adapted to find support, in any known manner, against the corresponding upright side walls of base 1. Finally, side panels 45 are mounted along the outer edge of outward sleeping panels 39 as with hinges 47, adjustable jacks 49 serving to retain the side panels 45 into vertical position when the sleeping panels 39 are outstretched in horizontal position. It is believed that operation of the sleeping panels is clear from the illustration of FIG. 5. It may be simply said that for use, the two sets of panels are first pivoted 270 degrees from the top edges of base 1 and until stay 43 is applied against the side walls thereof. Outward panels 39 and side panels 45 are thereafter successively unfolded as shown in the various dotted line illustrations of FIG. 5.

The tent-like projections 13 hang, as aforesaid, from cover 11 along with the tent forward panels 14, one of which has a door 12 defined therein. It should be understood that the tent projections 13 are outstretched after the panel assemblies 39, 39' and 45 are outstretched in the position illustrated in the rightward side of FIG. 5.

Although a specific embodiment has been illustrated and described, it should be understood that various modifications may be made thereto within the scope of the invention as set forth in the appended claims.

I claim:
1. In a trailer-tent, the combination comprising:
  (a) a wheeled box-like base having four side panels and an open top;
  (b) a cover for said box-like base liftable away therefrom;
  (c) pivot shafts mounted for rotation transversely of said box-like base, outwardly thereof and at each lower end;
  (d) pairs of arms located outside the panels and extending in planes parallel to the sides of the base;
  (e) for each pair of arms, an articulated joint connecting two ends; a pivot joint connecting one free end to said cover for pivoting the said pair of arms in one plane parallel to the side of the base, and means securely mounting the other free end to one of said shafts,
  (f) a tent-like material hanging around said cover;
  (g) links secured at one end to and radially projecting from said shafts;
  (h) reversely threaded sleeves pivotally mounted on the other end of said links;
  (i) an operating rod correspondingly threaded at the ends thereof and threaded in said sleeves, and
  (j) means to cause rotation of said threaded rod to rotate said links said shafts whereby to bring said arms in said in and out of alignment position.

2. A combination as claimed in claim 1, including guiding bars upwardly secured to an outer face of said box-like base to project away from said open top and means along the corresponding edge of said cover through which said bars slidably extend to guide said cover in the vertical movement thereof.

3. A combination as claimed in claim 1 including, on each of two opposite sides of said base, a pair of sleeping panels pivoted along a common edge thereof to be foldable one over the other, pivot means joining the opposite edge of one of said panels to said open top and means to retain said panels in horizontal outstretched position outside said box-like base.

References Cited by the Examiner

UNITED STATES PATENTS

| | | | |
|---|---|---|---|
| 268,947 | 12/1882 | Schuh | 52—109 |
| 1,597,265 | 8/1926 | Cashiere | 52—109 |
| 2,640,721 | 6/1953 | Kors | 52—66 X |
| 2,729,497 | 1/1956 | Runyan | 296—23 |
| 2,798,760 | 7/1957 | Hille | 296—23 |
| 3,003,807 | 10/1961 | Plett | 296—23 |
| 3,048,438 | 8/1962 | Koch | 296—23 X |
| 3,184,261 | 5/1965 | Young | 296—26 |

FOREIGN PATENTS 676,997   1952   Great Britain.

FRANK L. ABBOTT, *Primary Examiner.*

JOHN E. MURTAGH, *Examiner.*